US009205455B2

(12) United States Patent  
Miao et al.

(10) Patent No.: US 9,205,455 B2
(45) Date of Patent: Dec. 8, 2015

(54) SURFACE TREATMENT OF MIRROR FINISH

(71) Applicant: Nano and Advanced Materials Institute Limited, Hong King (HK)

(72) Inventors: Jianying Miao, Hong Kong (HK); Wei Li, Hong Kong (HK); Shing Hang Ng, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 0 days.

(21) Appl. No.: 14/564,030

(22) Filed: Dec. 8, 2014

(65) Prior Publication Data

US 2015/0190845 A1    Jul. 9, 2015

Related U.S. Application Data

(60) Provisional application No. 61/965,421, filed on Jan. 30, 2014, provisional application No. 61/965,417, filed on Jan. 30, 2014, provisional application No. 61/965,420, filed on Jan. 30, 2014, provisional application No. 61/964,586, filed on Jan. 9, 2014, provisional application No. 61/964,584, filed on Jan. 9, 2014.

(51) Int. Cl.
*B44C 1/22* (2006.01)
*B05D 3/12* (2006.01)
(Continued)

(52) U.S. Cl.
CPC *B05D 3/12* (2013.01); *B05D 5/063* (2013.01); *B05D 7/586* (2013.01); *B44F 1/02* (2013.01); *C09D 163/00* (2013.01); *C23C 18/1689* (2013.01); *C23C 18/1692* (2013.01); *C23C 18/1806* (2013.01); *C23C 18/1844* (2013.01); *C23C 18/2006* (2013.01); *C23C 18/2086* (2013.01); *C23C 18/285* (2013.01); *C23C 18/42* (2013.01); *B05D 3/101* (2013.01);
(Continued)

(58) Field of Classification Search
USPC .................................... 216/38, 95, 100, 103
See application file for complete search history.

(56) References Cited

U.S. PATENT DOCUMENTS 8,173,221 B2     5/2012  Jennings et al.
2006/0014024 A1  1/2006  Itakura et al.
(Continued)

FOREIGN PATENT DOCUMENTS

CN    100494489 C    6/2009
CN    101469427 A    7/2009
(Continued)

OTHER PUBLICATIONS

European Search Report issued on Jun. 5, 2015.

*Primary Examiner* — Binh X Tran
(74) *Attorney, Agent, or Firm* — Ella Cheong Hong Kong; Sam T. Yip

(57) ABSTRACT

The present invention develops a method of treating metallic or plastic substrates to form mirror finish. After several pretreatment steps to modify the surface situation of the substrate, whether for metallic or plastic material, to enhance the adhesion of above coating layers, a layer of mirror finish will be applied, with the function of decoration shown with metal appearance and glossy. A changeable topcoat will be coated to protect below mirror finish layer and achieve colorful decoration. All materials and processing steps are environmentally friendly, and involved without expensive facilities.

15 Claims, 1 Drawing Sheet

(51) Int. Cl.
*B44F 1/02* (2006.01)
*C23C 18/18* (2006.01)
*C09D 163/00* (2006.01)
*C23C 18/16* (2006.01)
*C23C 18/20* (2006.01)
*C23C 18/28* (2006.01)
*C23C 18/42* (2006.01)
*B05D 5/06* (2006.01)
*B05D 7/00* (2006.01)
*B05D 3/10* (2006.01)
*B05D 3/14* (2006.01)
*C23C 18/44* (2006.01)

(52) U.S. Cl.
CPC ............... *B05D 3/102* (2013.01); *B05D 3/105* (2013.01); *B05D 3/144* (2013.01); *B05D 2201/00* (2013.01); *B05D 2202/00* (2013.01); *C23C 18/44* (2013.01); *Y10T 428/31515* (2015.04)

(56) References Cited

U.S. PATENT DOCUMENTS

| | | |
|---|---|---|
| 2006/0135281 A1 | 6/2006 | Palumbo et al. |
| 2006/0135282 A1 | 6/2006 | Palumbo et al. |
| 2010/0048954 A1* | 2/2010 | Vedage ............... C07C 209/48 564/372 |
| 2012/0295121 A1 | 11/2012 | Miao et al. |
| 2013/0199830 A1* | 8/2013 | Morita ................... C08L 63/00 174/258 |
| 2014/0179830 A1* | 6/2014 | Burckhardt ........... C08L 101/00 523/425 |
| 2014/0309334 A1* | 10/2014 | Kramer .................. C08G 59/50 523/400 |
| 2015/0125680 A1* | 5/2015 | Araki ..................... G06F 3/041 428/216 |

FOREIGN PATENT DOCUMENTS

| | | |
|---|---|---|
| EP | 0897759 A2 | 2/1999 |
| WO | 9310975 A1 | 6/1993 |
| WO | 2007126276 A1 | 11/2007 |

* cited by examiner

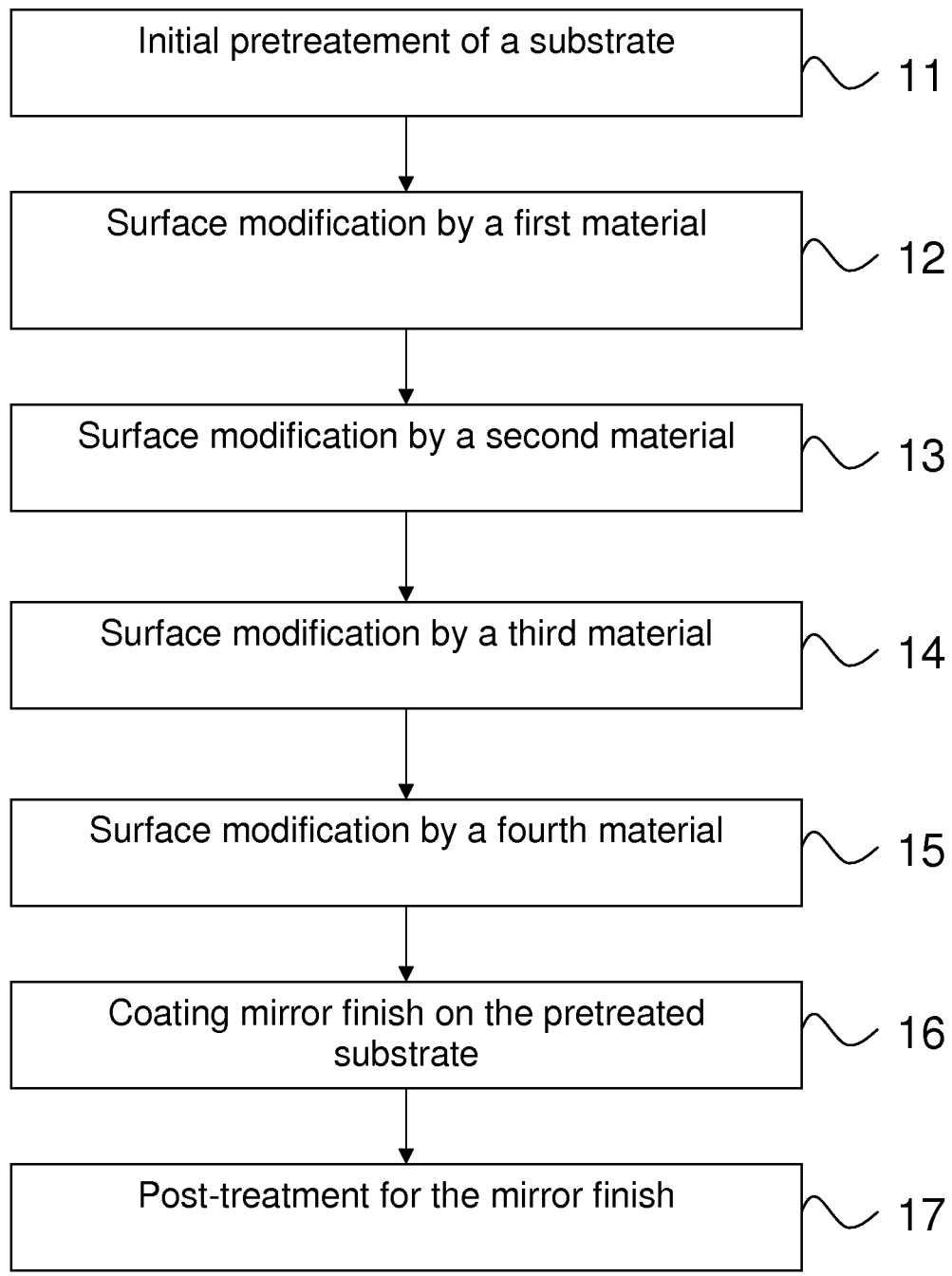

US 9,205,455 B2

SURFACE TREATMENT OF MIRROR FINISH

CROSS REFERENCE TO RELATED APPLICATION

Pursuant to 35 U.S.C. §119(e), this is a non-provisional patent application which claims benefits from U.S. provisional patent application Ser. No. 61/965,421 filed Jan. 30, 2014, U.S. provisional patent application Ser. No. 61/965,417 filed Jan. 30, 2014, U.S. provisional patent application Ser. No. 61/965,420 filed Jan. 30, 2014, U.S. provisional patent application Ser. No. 61/964,586 filed Jan. 9, 2014, U.S. provisional patent application Ser. No. 61/964,584 filed Jan. 9, 2014, and the disclosures of which are incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a mirror finish formed on a substrate, and more particularly relates to a pretreatment method for forming a mirror finish on a substrate.

BACKGROUND

Mirror finish on metallic or plastic substrate is achieved by several traditional methods, such as electroplating, vacuum deposition and thermal evaporation. Besides of the functions of protection to the substrate and decoration of metallic feeling, the layer of mirror finish can also provide other performances or properties, such as electric or thermal conductivity. However, these traditional treatments have their own drawbacks.

Electroplating, the most commonly used surface treatment in industry, is harmful to the environment owing to large quantity of toxic byproducts and wastes. The whole process operates at high cost, owing to the complicated post-treatment procedures. This limits and blocks the further development of electroplating industry. More and more countries forbid or limit the industry of electroplating by lots of policies.

Vacuum deposition and thermal evaporation use expensive equipments, which cannot produce continuously. The batch production may make the yielding low and unstable of the product. Without other auxiliary methods to do the pre-treatment and post-treatment of the products, the performances of the coated products, especially for plastic products, by above methods may not be good enough, such as adhesion.

US20060135281 discloses a coating comprising a fine-grained metallic layer formed by electroformation (electroplating) showing a high stiffness. US20060135282 teaches a coating with small metallic material grain with size of 2 nm to 5,000 nm. A Chinese patent application, CN1944710A discloses a mirror-like coating formed by the reaction of silver nitrate solution and ammonia and sodium hydroxide. The coating is then developed by borohydride. CN101469427A teaches a silver mirror formed by spraying the solutions of silver nitrate and potassium tartrate and sodium hydroxide. The coating is post-treated by sodium sulfite.

In the above patent applications, electroplating methods are still used for the two U.S. inventions, which can not resolve the issues of high cost and environmental pollution of the wastes. Other two inventions just report the traditional mirror-like reaction of silver without special modification, which results in the poor adhesion of silver mirror-like coating and oxidation issue of the silver coating.

Consequently, there is an unmet need for a forming a mirror finish on a substrate with good adhesive property and low cost. In addition, such mirror finish can be manufactured in an effective and environmentally friendly way.

SUMMARY OF THE INVENTION

The present invention develops a method of treating metallic or plastic substrates to form mirror finish. After several pre-treatment steps to modify the surface situation of the substrate, whether for metallic or plastic material, to enhance the adhesion of above coating layers, a layer of mirror finish will be applied, with the function of decoration shown metal appearance and glossy. A changeable topcoat will be coated to protect below mirror finish layer and achieve colorful decoration. All coating materials and processing steps are environmentally friendly, without expensive facilities. Regular spraying system can be applied without major changes, which can achieve continuous production to get more uniform and stable coated products and increase the yielding.

Accordingly, a first aspect of the presently claimed invention is to provide a multi-step pretreatment method to a substrate to form a mirror-finish.

In accordance with an embodiment of the presently claimed invention, a method for pretreating a substrate for forming a mirror finish comprises: putting a first material on the substrate, wherein the first material comprises a first epoxy resin, a first leveling agent, butanol, acetone, diacetone alcohol, a first curing agent and 2,4,6 Tris(dimethylaminomethyl)phenol; curing the first material; putting a second material on the cured first material, wherein the second material comprises a second epoxy resin, a second leveling agent, glycidyl 2-methylphenyl ether, diacetone alcohol, butanol, a second curing agent and 2,4,6 Tris(dimethylaminomethyl) phenol; curing the second material; and coating a mirror finish on the cured second material.

Preferably, the method further comprises rinsing the cured second material by a mixed solvent.

Preferably, the method further comprises treating the cured second material by a solution mixture of tin (II) chloride and hydrochloric acid.

Preferably, the substrate is a metallic substrate or a plastic substrate.

Preferably, the method further comprises post-treating the mirror finish by putting a post-treatment material on the mirror finish.

A second aspect of the presently claimed invention is to provide a mirror-finish formed on a plastic or metallic substrate fabricated by the method of the present invention.

BRIEF DESCRIPTION OF THE DRAWINGS

Embodiments of the present invention are described in more detail hereinafter with reference to the drawings, in which:

FIG. 1 is a flowchart showing the steps of a method for fabricating a mirror finish coating on a metallic/plastic substrate according to an embodiment of the presently claimed invention.

DETAILED DESCRIPTION OF PREFERRED EMBODIMENTS

In the following description, a mirror finish formed on a metallic/plastic substrate, and the corresponding embodiments of the pretreatment method for the substrate are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

In this invention, a whole procedure of treating plastic or metallic substrates to achieve mirror finish is provided, which can not only be used as batch production, such as dipping, but also as continuous production, such as spraying in an automatic production line.

FIG. 1 is a flowchart showing the steps of a method for fabricating a mirror finish coating on a metallic/plastic substrate according to an embodiment of the presently claimed invention. In step 11, a substrate is firstly pretreated by an initial pretreatment. For the metallic substrate, the metallic substrate is polished with an abrasive paper. Then, the polished metallic substrate is cleaned by water, cleanser essence, acetone, and ethanol. For the plastic substrate, a plasma treatment, a chemical treatment, and/or a physical treatment can be used to pretreat the plastic substrate. In step 12, the surface of the pretreated substrate is modified with a first material to improve adhesion of the substrate. The first material is put on the pretreated substrates by dipping or spraying, and then cured in an oven. The first material comprises an epoxy resin such as E-51, a leveling agent such as BYK-361N, butanol, acetone, diacetone alcohol, a curing agent such as TZ-550 and 2,4,6-Tris(dimethylaminomethyl)phenol. In step 13, the surface of the pretreated substrate is modified with a second material to improve adhesion of mirror finish. The second material is put on the cured first material by dipping or spraying, and then cured in an oven. The second material comprises an epoxy resin such as E-51, a leveling agent such as BYK-361N, glycidyl 2-methylphenyl ether (CGE), diacetone alcohol, butanol, a curing agent such as TZ-550 and 2,4,6-Tris(dimethylaminomethyl)phenol. In step 14, the surface of the pretreated substrate is modified by a third material to enhance the formation of mirror finish. The surface of the pretreated substrate treated by the second material is rinsed with the third material. The third material is a kind of solution comprising a mixed solvent, such as 1:1 (vol. ratio) of acetone and ethanol. In step 15, the surface of the pretreated substrate is modified by a fourth material to enhance the formation of mirror finish. The fourth material is applied on the surface of the pretreated substrate treated by the third material, and then is dried at room temperature. The fourth material is a kind of solution comprising a mixture of tin (II) chloride and acid. In step 16, a layer of mirror finish is coated on the surface of the pretreated substrate. In step 17, a post-treatment for the mirror finish is conducted.

Preferably, the plastic substrate comprises acrylonitrile butadiene styrene (ABS), polypropylene (PP), or polycarbonate (PC), and the metallic substrate comprises iron, zinc, aluminum, magnesium, or their alloys.

Preferably, a step of putting a transparent or color changeable material (post-treatment material) will be done on mirror finish to protect it or increase some special functions, which can be produced by dipping or spraying, and then is under heat treatment in an oven.

Accordingly, the substrate pretreatment method of the present invention is applicable to both metallic and plastic substrates even though the surface of the both substrates carries different properties. The pretreatment method is able to enhance the adhesion between the substrate and mirror finish. No harmful and environment-unfriendly chemical is used in the present invention. In addition, the mirror finish fabricated by the method of the present invention provides high film hardness, scratch resistance and impact resistance.

Examples

Process of coating the metallic and plastic substrates mainly includes pre-treatment, putting functional coatings on and post-treatment.

1. Multi-Step Pretreatment of Substrate

Pre-treatment of substrate is different for metallic and plastic substrates, because the surface property of the two types of substrates is different.

1) Main steps for treating metallic substrates are shown below:

(1) Surface polishing: Polish the metallic substrate with abrasive papers of #240, #360 and #800 respectively. A vibrating grinder or drum grinder can also be used to polish the same substrates using suitable grinding stones. For soft metal, such as Al or Mg alloy, if polishing is not suitable, this step can be skipped.

(2) Substrate cleaning: Immerse the (polished) substrates into a mixture of DI water and cleanser essence. Sonicate the substrates for more than 30 minutes. Rinse the samples one by one using running DI water. Clean the substrates in 1:1 (vol.) acetone and ethanol by ultrasonication again for more than 30 minutes. Rinse the substrates with running ethanol. Dry them in air.

(3) Surface modification by material 1: The material 1 will be put on the pre-treated substrates by dipping or spraying, and then cured in an oven. Curing temperature can be changeable according to the substrate at a temperature range of 80~150° C. for at least 10 min. In general, low temperature is suitable for plastic substrate, and high temperature for metallic substrate. The material 1 will be used to modify the surface of the substrate to achieve good adhesion of above coating layer.

Example of the material 1 is about 10 g of E-51, 0.1 g of BYK-361N, 6 g of butanol, 1 g of acetone, 10 g of diacetone alcohol, 2 g of TZ-550 and 1 g of 2,4,6-Tris(dimethylaminomethyl)phenol. These chemicals will be added and mixed by stirring at room temperature for more than 30 min. If necessary, sonicate the mixture in an ultrasonic bath for 3 min. After being prepared, the material 1 should be stored at room temperature or low temperature such as 5~10° C. However, once added with the curing agent of TZ-550, the material 1 should be used up within 2 hours at room temperature.

(4) Surface modification by material 2: The material 2 will be put on the substrates coated with material 1 by dipping or spraying, and then cured in an oven. Curing temperature can be changeable according to the substrate at a temperature range of 80~150° C. for at least 10 min. In general, low temperature is suitable for plastic substrate, and high temperature for metallic substrate. This material 2 will be used to modify the surface property to achieve good adhesion to above coating layer.

Example of the material 2 is about 22 g of E-51, 0.2 g of BYK-361N, 2 g of CGE, 12 g of diacetone alcohol, 8 g of butanol, 5 g of TZ-550 and 1 g of 2,4,6-Tris(dimethylaminomethyl)phenol. These chemicals will be added and mixed by stirring at room temperature for more than 30 min. If necessary, sonicate the mixture in an ultrasonic bath for 3 min. After being prepared, the coating material 2 should be stored at room temperature or low temperature such as 5~10° C. However, once added with the curing agent of TZ-550, the material 2 should be used up within 1 hour at room temperature.

2) Main steps for treating plastic substrates are shown below:

(1) Plasma treatment: Place the plastic substrates in the plasma chamber, and treat them using plasma cleaner at high level for at least 20 min.

(2) Chemical treatment: Use different chemicals to treat different plastic materials. Examples are concentrated acid to ABS for 5~7 min, or strong oxidant of potassium permanganate for PP at 70° C. for 24 hrs.

(3) Physical treatment: If necessary, physical treatment of sandblasting can be used, with conditions of 3.2 bar for more than 1 min.

(4) Surface modification by material 1: The material 1 will be put on the pre-treated substrates by dipping or spraying, and then be under heat treatment in an oven. Heat treatment temperature can be changeable according to the substrate at a temperature range of 80~150° C. for at least 10 min. In general, low temperature is suitable for plastic substrate, and high temperature for metallic substrate. The material 1 will be used to modify the surface of the substrate to achieve good adhesion of above coating layer.

Example of the material 1 is about 10 g of E-51, 0.1 g of BYK-361N, 6 g of butanol, 1 g of acetone, 10 g of diacetone alcohol, 2 g of TZ-550 and 1 g of 2,4,6-Tris(dimethylaminomethyl)phenol. These chemicals will be added and mixed by stirring at room temperature for more than 30 min. If necessary, sonicate the mixture in an ultrasonic bath for 3 min. After being prepared, the material 1 should be stored at room temperature or low temperature such as 5~10° C. However, once added the component of TZ-550, the material 1 should be used up within 2 hours at room temperature.

(5) Surface modification by material 2: The material 2 will be put on the substrates coated with material 1 by dipping or spraying, and then be under heat treatment in an oven. Heat treatment temperature can be changeable according to the substrate at a temperature range of 80~150° C. for at least 10 min. In general, low temperature is suitable for plastic substrate, and high temperature for metallic substrate. The material 2 will be used to modify the surface property to achieve good adhesion to above coating layer.

Example of the material 2 is about 22 g of E-51, 0.2 g of BYK-361N, 2 g of CGE, 12 g of diacetone alcohol, 8 g of butanol, 5 g of TZ-550 and 1 g of 2,4,6-Tris(dimethylaminomethyl)phenol. These chemicals will be added and mixed by stirring at room temperature for more than 30 min. If necessary, sonicate the mixture in an ultrasonic bath for 3 min. After being prepared, the material 2 should be stored at room temperature or low temperature such as 5~10° C. However, once added with the component of TZ-550, the material 2 should be used up within 1 hour at room temperature.

(6) Surface modification by material 3: Rinse the surface treated by above materials with a running mixed solvent, such as 1:1 (vol. ratio) of acetone and ethanol. This can be achieved by using wash bottle. After that, rinse the surface with running DI water. Dry the surface at room temperature. The mixed solvent can be stored at room temperature with a closed cap, which should be able to keep effective for long time (days or weeks) after being prepared. Treatment of this step will make the surface rough so as to enhance the adhesion to above coating layer.

(7) Surface modification by material 4: The material 4 is a kind of solution which can be used by dipping or spraying. After being treated, the substrate will dry at room temperature.

Example of the material 4 is about 2 g of tin (II) chloride and 2 mL of hydrochloric acid (37%). Heat the solution at ~60° C. for ~10 minutes until a clear solution is formed. After that, add 400 mL of DI water at room temperature, and swirl the solution thoroughly. The solution will be aged at room temperature with cap closed for at least 4 hours before use. The solution will be stored at room temperature and cap closed. The solution should keep effective for 1-2 weeks after being prepared. Treatment of this step is to form some activated position on the surface of below substrate, and then make the reaction of forming mirror finish be easier.

2. Preparation of Mirror Finish on Substrate after being Treated as Above Steps 2 solutions will be put on the substrates after being treated as above steps by dipping or spraying, and then cured in an oven. While dipping, 2 solutions will be mixed and applied on the substrates immediately. If spraying is used, a double head spraying gun or 2 single head spraying gun working simultaneously are necessary, with 2 solutions in 2 separate containers. Curing temperature can be changeable according to the substrate at a temperature range of 80~150° C. for at least 10 min. In general, low temperature is suitable for plastic substrate, and high temperature for metallic substrate. This coating layer will achieve mirror finish.

Example of the 2 solutions is prepared as shown below:

2-1) Solution 1 for mirror finish will be prepared as follows, which should be prepared while using and should not be stored for a long time.

1) Add 20 mL of DI water into an empty glass beaker;
2) Add 6 g of sodium hydroxide slowly into above glass beaker;
3) Stir the above solution carefully at room temperature until all solids being dissolved;
4) Add 10 g of silver nitrate into an empty glass bottle;
5) Add 100 mL of DI water into above glass bottle;
6) Stir the above solution at room temperature until all solids being dissolved;
7) Pour solution 3) into the solution 6);
8) Stir the above solution thoroughly (brown precipitate will be formed);
9) Add 20 mL of 28% aqueous ammonia into another empty glass beaker;
10) Add 50 mL of DI water into above glass beaker;
11) Stir the above solution thoroughly;
12) Drop solution 11) into solution 8) until all brown precipitate is just re-dissolved (around 60 mL of ammonia solution will be used) and a clear solution will be formed;
13) Dilute the clear solution to be total volume of 1000 mL with DI water;

2-2) Solution 2 for mirror finish will be prepared as below, and stored at room temperature and cap closed. The solution should keep effective for months after being prepared.

1) Add 8 g of glucose into an empty glass bottle;
2) Add 0.5 g of citric acid;
3) Add 20 mL of ethanol;
4) Add 980 mL of DI water;
5) Stir the solution thoroughly until all solids being dissolved;

3. Post-Treatment after Coating Mirror Finish

A step of putting a transparent or color changeable material (post-treatment material) will be done on mirror finish to protect it or increase some special functions, which can be produced by dipping or spraying, and then is under heat treatment in an oven. Heat treatment temperature can be changeable according to the substrate at a temperature range of 80~150° C. for at least 10 min. In general, low temperature is suitable for plastic substrate, and high temperature for metallic substrate. This post-treatment will protect below coating layer of mirror finish, while changing different colors to the whole appearance or providing other special functions.

Example of the post-treatment material is about 15 g of methyltriethoxysilane (MTES), 2 g of γ-mercaptopropyltrimethoxysilane (A189), 6 g of ethanol, 0.5 g of acetic acid, 5 g of acetone, 5 g of DI water, 2 g of LUDOX® HS-30 colloidal silica and 15 g of diacetone alcohol. These chemicals will be added and mixed by stirring at room temperature for more than 15 min. If necessary, sonicate the mixture in an ultrasonic bath for 45 min until getting a transparent solution. After that, heat the post-treatment material in an oven at 70° C. for 18 hrs, and then cool down to room temperature and keep for 24 hrs. The post-treatment material should be stored at room temperature or low temperature such as 5~10° C.

Example of adjusting color to the post-treatment material is to filter the above colorless topcoat solution use a polytetrafluoroethylene (PTFE) filter (450 nm pore size) at first. Mix 50 g of filtered colorless post-treatment material with 11 mg of crystal violet to get a homogeneous solution.

Property & Performance Tests

Various performance tests for the mirror finish with acrylonitrile butadiene styrene (ABS) and polypropylene (PP) substrates according to the above examples of the present invention were conducted.

A film hardness test with standard ASTM D3363-05/ISO 15184:1998 (ISO 15184:2012) was conducted. Under a condition providing a loading of 750 g, the testing result shows 4H with no visible change and 6H without being broken. A same test was conducted with a conventional mirror coating sold in the market, and the testing result is only 2H.

An adhesion by tape test with standard ASTM D3359-02/ISO 2409:2007 was conducted. Under a condition having cross-cut, the testing result shows 5B (100% no release). A same test was conducted with the conventional mirror coating sold in the market, and the testing result shows release with 100/100.

A scratch resistance test with standard ISO 1518-1:2011 was conducted. The test panel held in a panel holder was moved relative to the stylus by means of a motor. The speed at which the stylus travels was (35±5) mm/s. Scratch stylus type A which had a hemispherical hard-metal tip of radius (0.50±0.01) mm, was chosen to be used in this experiment. The testing result shows that the surface coating passes the 150 g test for ABS and 81 g test for PP.

A REACH test with API guideline was conducted. None of the 155 substrates in the candidate list of Substance of Very High Concern (SVHC) has been detected.

An abrasion resistance test with standard ASTM F2357-04 was conducted. After having 100 cycles of abrasion, the loss of mirror finish with the ABS substrate is 3.3 mg and the loss of mirror finish with the PP substrate is 2.1 mg.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for pretreating a substrate for forming a mirror finish, comprising:
    putting a first material on the substrate, wherein the first material comprises a first epoxy resin, a first leveling agent, butanol, acetone, diacetone alcohol, a first curing agent and 2,4,6 Tris(dimethylaminomethyl)phenol;
    curing the first material;
    putting a second material on the cured first material, wherein the second material comprises a second epoxy resin, a second leveling agent, glycidyl 2-methylphenyl ether, diacetone alcohol, butanol, a second curing agent and 2,4,6 Tris(dimethylaminomethyl)phenol;
    curing the second material; and
    coating a mirror finish on the cured second material.

2. The method of claim 1, further comprising: treating the cured second material by a solution mixture of tin (II) chloride and hydrochloric acid.

3. The method of claim 1, wherein the step of putting the first material on the substrate is performed by dipping or spraying.

4. The method of claim 1, wherein the step of putting the second material on the substrate is performed by dipping or spraying.

5. The method of claim 1, wherein the step of curing the first coating material is performed at a temperature range of 80 to 150° C.

6. The method of claim 1, wherein the step of curing the second coating material is performed at a temperature range of 80 to 150° C.

7. The method of claim 1, further comprising:
    post-treating the mirror finish by putting a post-treatment material on the mirror finish, wherein the post-treatment material comprises methyltriethoxysilane, γ-mercaptopropyltrimethoxysilane, ethanol, acetic acid, acetone, DI Water, colloidal silica and diacetone alcohol; and
    curing the post-treatment material.

8. The method of claim 1, further comprising:
    rinsing the cured second material by a mixed solvent.

9. The method of claim 8, wherein the mixed solvent comprises acetone and ethanol at a volume ratio of 1 to 1.

10. The method of claim 1, wherein the substrate is a metallic substrate or a plastic substrate.

11. The method of claim 10, further comprising:
    pretreating the metallic substrate by an initial treatment before the step of putting the first material on the substrate.

12. The method of claim 11, wherein the initial treatment comprise:
    polishing the metallic substrate; and
    cleaning the metallic substrate with water and a cleanser essence.

13. The method of claim 10, further comprising:
    pretreating the plastic substrate by an initial treatment before the step of putting the first material on the substrate.

14. The method of claim 13, wherein the initial treatment is a plasma treatment, a chemical treatment, or a physical treatment.

15. A mirror finish formed on a substrate fabricated by the method of claim 1.

* * * * *